Patented June 27, 1939

2,164,268

UNITED STATES PATENT OFFICE 2,164,268

HEXANEPENTOLS AND THEIR PROCESS OF PREPARATION

Lloyd W. Covert, Philadelphia, Pa., assignor to Röhm & Haas Company, Philadelphia, Pa.

No Drawing. Application September 24, 1937, Serial No. 165,487

17 Claims. (Cl. 260—635)

This invention relates to the art of making stable polyhydric alcohols by the catalytic hydrogenation of sugars. More specifically it relates to a process by which hexoses and hexitols or even polysaccharides can be converted into polyhydric alcohols that have five hydroxyl groups on a six carbon chain and the general formula $C_6H_{14}O_5$. These polyhydric alcohols are herein designated hexanepentols.

The process of hydrogenating hexoses to the hexitol stage, either catalytically or electrolytically, is well known. For example, glucose is easily hydrogenated to sorbitol, or fructose to mannitol. These hydrogenations are simply the saturation of an aldehyde or keto group and are usually carried out under relatively mild conditions such that hydrogenation stops when the hexitol is produced.

In prior art processes wherein sugars were hydrogenated further than the hexitol stage, the principal products have been glycerol and propanediol. The formation of glycerol and propanediol requires that the carbon chain in the sugar molecule be broken and indeed the formation of glycerol by such a process has usually been the desired reaction. Such processes are disclosed in British Patent 299,373 (1927), United States Patent 1,963,997 (1934), and United States Patent 2,004,135 (1935). See also Ellis, Hydrogenation of organic substances, 3rd ed. (D. Van Nostrand Company), par. 6334. Zartman and Adkins, J. Am. Chem. Soc. 55, 4559-63 (1933) disclose the formation of small amounts of hexanediol, triol, and tetrol together with large amounts of 1,2-propanediol.

In the processes for producing glycerol from sugars by hydrogenation, the yield of glycerol is always low. It appears that not more than one molecule of glycerol can be obtained from one molecule of hexose, which means that at least half the weight of hexose is lost to less valuable products. The consumption of hydrogen for the production of glycerol by such a means is much greater than if two glycerol molecules could be obtained from one hexose.

The object of this invention is to provide a process for converting hexitol, hexoses or polysaccharides into more stable polyhydric alcohols that may be obtained in good yields and with a minimum of hydrogen. A further object is to provide a method for economically producing hexanepentols from readily available raw materials.

In the present invention these objects are realized through the application of my discovery that hexanepentols can be produced from hexitols and hexoses by a controlled catalytic hydrogenation. I have found that in the first stages of the hydrogenation of hexitols and hexoses the reaction is not accompanied by a hydrogenolysis or splitting of the carbon chain so that by stopping the reaction when the amount of hydrogen consumed is sufficient only to saturate the carbonyl groups of the hexoses and to reduce but one alcohol group of the resulting hexitol, high yields of hexanepentols are obtainable. These hexanepentols thus produced are much more heat stable than the corresponding hexitols or hexoses and are therefore more suitable to industrial uses. As the cheap and abundant sugars, such as glucose and sucrose, may be used as starting material in the process, a cheap and pure raw material is readily available.

The hydrogenation conditions under which the process is carried out do not vary substantially from those heretofore used in the reduction of hexoses and hexitols. When the hexoses are used as starting material, the first step of the process is a saturation of the carbonyl group to form a hexitol. This step is preferably carried out at a temperature of 125–150° C. If the temperature is permitted to rise much above 150° C. the hydrogenation is apt to be accompanied by considerable carbonization, thereby reducing the yield of hexitol. In the conversion of the hexitol to hexanepentols, it is also advantageous to use as low a temperature as permits a satisfactory rate of reaction. Temperatures between 180 and 300° C. may be used but operating within the range of from 200° C. to 250° C. will in general give more satisfactory results. A superatmospheric pressure of hydrogen should also be used. In order to obtain a useful rate of reaction, a pressure of at least 25 atmospheres is desirable. As is well known, however, the speed of hydrogenation is increased with increasing pressures, so that a pressure of from 50 to 150 atmospheres is more practical. Higher pressures may be used but without much improved results.

The two steps of the hexose conversion can be carried out either separately or combined as different stages in a single operation. This latter can be accomplished by treating hexose with hydrogen in the presence of a hydrogenation catalyst first at a temperature conducive to the saturation of the carbonyl group until one molecular equivalent of hydrogen is absorbed and thereafter raising the temperature to above 180° C. until a second molecular equivalent of hydrogen is reacted. This can conveniently be done by heating the reaction mixture slowly so that by the time it reaches 180° C. one molecular equivalent of hydrogen has reacted.

The starting materials for the process may be any hexose or hexitol or any sugar which can be hydrolyzed to form the hexose or hexitol. Glucose is a cheap and abundant raw material from which the corresponding hexitol, sorbitol, can be made either as a separate step or in conjunction with the present process. Fructose may be used similarly. Sucrose is a polysaccharide which is readily available and which when hydrolyzed or inverted forms glucose and fructose. Sucrose may be hydrogenated directly in water solution in the same manner as if it had been previously hydrolyzed or it may be first inverted. Likewise, other sugars may be used, for example, mannose, lactose, maltose and galactose. If polysaccharides are used they may previously be hydrolyzed by any of the well known means, such as enzymes or warm dilute acids.

The process may be carried out in a batch operation or continuously. The necessity of controlling the amount of hydrogen absorbed however, makes the batch process easier to operate. In order to illustrate the invention more clearly the following examples are given with the understanding that they are not to be construed as limitations on the invention.

Example 1.—125 grams of glucose monohydrate dissolved in 125 grams of water and 10 grams of an active nickel catalyst were put in a shaking autoclave. Hydrogen at a pressure of 1500 pounds per square inch at 20° C. was added. The autoclave was then slowly heated with shaking to a temperature of 225° C. in the course of two hours and held at that temperature until two molecular equivalents of hydrogen were absorbed. Whenever the pressure dropped to 1200 pounds per square inch, more hydrogen was added to raise it to 1800 pounds per square inch. A decrease in pressure took place at about 150° C., indicating that the glucose was being hydrogenated to sorbitol at that temperature. The completion of the reaction was determined by measuring the total pressure drop. For the particular autoclave used two molecular equivalents of hydrogen amounted to a total pressure drop of 2340 lbs. per square inch at 225° C. The time required for this was 3.1 hours. When the two molecular equivalents of hydrogen were absorbed the autoclave was cooled and the product removed and filtered. The water was removed by distillation at 80° C./25 mm. in the presence of a small stream of nitrogen. The product was then a very viscous, colorless liquid which was practically odorless. The weight yield was 83.2%. The theoretical weight yield of hexanepentol from glucose monohydrate was 83.9%.

The product was then heated to 220° C./5 mm. pressure and less than 2% of material distilled over. Since the hexanepentols are not distillable and any fragments which could be formed by splitting the carbon chain during hydrogenation would distill below this point, the small amount of volatile material shows that substantially no hydrogenolysis took place during the reaction. That the conversion from hexitol to hexanepentols is substantially complete is shown by the amount of water in the reaction product being very close to the theoretical amount for the reduction of one hydroxyl group. An analysis of the product for carbon, hydrogen and oxygen gave results closely approximating the theoretical for hexanepentols.

Example 2.—A solution of 400 grams of sorbitol in 400 grams of water was put in an agitating autoclave with 20 grams of nickel catalyst and hydrogenated at 225° and 2000 to 3000 pounds per square inch hydrogen pressure until one molecular equivalent of hydrogen was absorbed. The product was worked up and analyzed in the same manner as in Example 1. The weight yield of hexanepentol obtained was practically the theoretical. Mannitol can be converted to hexanepentol in a similar way.

Example 3.—A solution of 50 grams of anhydrous fructose in 150 grams of water was hydrogenated in the presence of 5 grams of nickel catalyst in the same manner as in Example 1. Two molecular equivalents of hydrogen were absorbed in two hours and 21 minutes, at which time the run was stopped. The product when filtered free of catalyst was a colorless solution. After drying at 80° C./25 mm. the weight yield of hexanepentol obtained was 92.0%. The theoretical weight yield was 92.2%. The product was similar in properties and characteristics to the hexanepentol obtained from glucose. When 50 grams of galactose monohydrate was substituted for the fructose the theoretical yield of hexanepentol was obtained in a two-hour hydrogenation.

Example 4.—Sucrose was inverted to a mixture of glucose and fructose solution in 0.1 N-aqueous oxalic acid by warming to 70° C. for ten minutes. The oxalic acid was removed by means of barium carbonate. The solution was then concentrated to 50% by weight and 250 grams hydrogenated as in Example 1 until two molecular equivalents of hydrogen were absorbed. The time required was 1.3 hours. The hexanepentol product was obtained in a 92.5% weight yield. The theoretical yield was 92.2%.

In an analogous run sucrose was hydrogenated without first being inverted to glucose and fructose. A good yield of hexanepentol was obtained.

In each of these examples nickel was used as the catalyst. While I prefer to use a metallic nickel catalyst the reaction may also be carried out in the presence of any of the other known active hydrogenation catalysts. Metallic catalysts such as cobalt, iron, platinum, etc. when used alone or in admixture with one another or other catalytic compositions such as activated alumina, chromium oxide, etc. may be used. Oxide catalysts such as those of the copper chromite type are also useful.

In the above examples water was used as a solvent. While it is advantageous to use a solvent particularly when sugars are hydrogenated, other liquids than water may be used. Mixtures of water and alcohols or polyhydric alcohols and the hexanepentols produced by the process are particularly suitable solvents that may be used in place of water.

The hexanepentols obtained by practicing this invention are very useful as polyhydric alcohols. They are colorless, viscous liquids or white solids that have good thermal stability and may be used in reactions at temperatures which would cause ordinary sugars to carbonize and at which the hexitols are unstable. They may be used in nearly every way in which it is desired to use a high boiling polyhydric alcohol. For example, they are suitable substitutes for glycerol in making resinous compositions of the alkyd type with such polybasic acids as phthalic, maleic, sebacic, succinic, and the like, either unmodified or modified with monobasic acids such as rosin or fatty oil acids, either of the drying, non-drying or semi-drying type. They are also useful as plasticizers either alone or in the form of esters. Inorganic or organic esters and their salts or other derivatives may be used as wetting, emulsifying or detergent agents. Certain esters may be used in wax compositions. The hexanepentols may also be used as lubricants for various purposes and as softening agents for textiles.

I claim:

1. A process of producing hexanepentols which comprises reacting a hexitol with an approximately equimolecular amount of hydrogen in the presence of a hydrogenation catalyst at a temperature of 180–300° C.

2. A process of producing hexanepentols which comprises reacting a hexitol with an approximately equimolecular amount of hydrogen in the presence of a hydrogenating metal catalyst at a temperature of 180–300° C. and a pressure in excess of 25 atmospheres.

3. A process of producing hexanepentols which comprises reacting a hexitol with an approximately equimolecular amount of hydrogen in the presence of a metallic nickel catalyst at a temperature of 200–250° C. and a pressure between 50 and 150 atmospheres.

4. A process of producing hexanepentols which comprises slowly heating a hexose solution to a temperature of 180–300° C. in the presence of hydrogen and a hydrogenation catalyst, maintaining said temperature until two mols of hydrogen per mol of hexose react and then stopping the reaction, the rate of heating being such that approximately one molecular equivalent of hydrogen reacts with the hexose before the temperature reaches 180° C.

5. A process of producing hexanepentols which comprises slowly heating a hexose solution to a temperature of 180–300° C. in the presence of a hydrogenating metal catalyst and hydrogen under a pressure in excess of 25 atmospheres, maintaining said temperature and pressure until two mols of hydrogen per mol of hexose react and then stopping the reaction, the rate of heating being such that approximately one molecular equivalent of hydrogen reacts with the hexose before the temperature reaches 180° C.

6. A process of producing hexanepentols which comprises slowly heating an aqueous hexose solution to a temperature of 250° C. in the presence of a metallic nickel catalyst and hydrogen under a pressure of from 50–150 atmospheres maintaining said temperature and pressure until two mols of hydrogen per mol of hexose react and then stopping the reaction, the rate of heating being such that approximately one molecular equivalent of hydrogen reacts with the hexose before the temperature reaches 180° C.

7. A process of producing hexanepentols which comprises slowly heating an aqueous solution of glucose to a temperature of 200–250° C. in the presence of a hydrogenation catalyst and hydrogen under a pressure in excess of 25 atmospheres, maintaining said temperatures and pressure until two mols of hydrogen per mol of glucose react, and then stopping the reaction, the rate of heating being such that approximately one molecular equivalent of hydrogen reacts with the glucose before the temperature reaches 180° C.

8. A process of producing hexanepentols which comprises catalytically hydrogenating a hexose to a hexitol and reacting the hexitol with an approximately equimolecular amount of hydrogen in the presence of a hydrogenation catalyst at a temperature of 180–300° C.

9. A process of producing hexanepentols which comprises catalytically hydrogenating a hexose to a hexitol and reacting the hexitol with an approximately equimolecular amount of hydrogen in the presence of a hydrogenating metal catalyst at a temperature of 180–300° C. and a pressure in excess of 25 atmospheres.

10. A process of producing hexanepentols which comprises catalytically hydrogenating a hexose to a hexitol and reacting the hexitol with an approximately equimolecular amount of hydrogen in the presence of a metallic nickel catalyst at a temperature of from 200–250° C. and a pressure between 50 and 150 atmospheres.

11. A process of producing hexanepentols which comprises converting a polysaccharide to a hexitol by catalytic hydrogenation and reacting the hexitol with an approximately equimolecular amount of hydrogen in the presence of a hydrogenation catalyst at a temperature of 180–300° C. and a pressure in excess of 25 atmospheres.

12. A process of producing hexanepentols which comprises converting a polysaccharide to a hexose, catalytically hydrogenating the hexose to a hexitol and reacting the hexitol with an approximately equimolecular amount of hydrogen in the presence of a hydrogenation catalyst at a temperature of 180–300° C. and a pressure in excess of 25 atmospheres.

13. As new compositions of matter hexanepentols that are obtainable by catalytically reacting a hexitol with one molecular equivalent of hydrogen at a temperature between 180° C. and 300° C.

14. As new compositions of matter hexanepentols that are obtainable by catalytically reacting sorbitol with one molecular equivalent of hydrogen at a temperature between 180° C. and 300° C.

15. As new compositions of matter hexanepentols that are obtainable by catalytically reacting mannitol with one molecular equivalent of hydrogen at a temperature between 180° C. and 300° C.

16. As new compositions of matter hexanepentols that are obtainable by the process of claim 4.

17. As new compositions of matter hexanepentols that are obtainable by the process of claim 12.

LLOYD W. COVERT.